US012521749B1

(12) United States Patent
Yan

(10) Patent No.: US 12,521,749 B1
(45) Date of Patent: Jan. 13, 2026

(54) FALL-PREVENTION MOVABLE WALL MOUNT

(71) Applicant: Xiamen Galenpoo Kitchen&Bathroom Technology Co., Ltd., Xiamen (CN)

(72) Inventor: Xiaoling Yan, Xiamen (CN)

(73) Assignee: Xiamen Galenpoo Kitchen & Bathroom Technology Co.,Ltd., Xiamen (CN)

( * ) Notice: Subject to any disclaimer, the term of this patent is extended or adjusted under 35 U.S.C. 154(b) by 0 days.

(21) Appl. No.: 19/232,454

(22) Filed: Jun. 9, 2025

(51) Int. Cl.
*B05B 15/60* (2018.01)
*B05B 15/62* (2018.01)

(52) U.S. Cl.
CPC .................................... *B05B 15/62* (2018.02)

(58) Field of Classification Search
CPC .. B05B 1/185; B05B 1/18; B05B 1/16; B05B 15/62; B05B 15/652; B05B 15/654; E03C 1/06; E03C 1/0408; E03C 1/0409
USPC ...................................................... 239/587.3
See application file for complete search history.

(56) References Cited

U.S. PATENT DOCUMENTS 11,149,417 B2 * 10/2021 Wu ........................ E03C 1/0408
11,712,703 B2 * 8/2023 Dai ........................... E03C 1/06
239/556
2015/0115064 A1 * 4/2015 Wu ......................... B05B 1/185
239/443
2016/0236223 A1 * 8/2016 Scheffer .................... E03C 1/06
2017/0014849 A1 * 1/2017 Gao ...................... E03C 1/0409
2018/0104707 A1 * 4/2018 Lin ....................... B05B 1/1609
2018/0193851 A1 * 7/2018 L'Henaff .................. B05B 1/18
2019/0083991 A1 * 3/2019 Lin ......................... B05B 1/185
2021/0060598 A1 * 3/2021 Lee ........................... E03C 1/06
2021/0178410 A1 * 6/2021 Davies .................. E03C 1/0408
2023/0407613 A1 * 12/2023 Li ............................. E03C 1/06
2024/0399393 A1 * 12/2024 Hofman .................... B05B 1/18
2025/0129585 A1 * 4/2025 Hofman ................ E03C 1/0409

FOREIGN PATENT DOCUMENTS

CN 210177608 U 3/2020
CN 210177609 U 3/2020
CN 220978370 U 5/2024

* cited by examiner

*Primary Examiner* — Charles P. Cheyney
(74) *Attorney, Agent, or Firm* — Nitin Kaushik

(57) ABSTRACT

The present invention discloses a fall-prevention movable wall mount, including a fixed base, a movable head, and a magnetic assembly. The fixed base has a fixed surface on one side and is connected to one side of the movable head on the other side, the magnetic assembly is mounted on the other side of the movable head, and the magnetic assembly is configured to detachably attract and fix a handheld shower. Thus, the fixed base has the fixed surface, and a structure such as double-sided tape, glue, or suction cup may be provided on the fixed surface, allowing the fixed base to be freely and conveniently fixed at any position on a wall surface, with quick and convenient mounting. With a ball head part with the magnetic assembly arranged, the handheld shower can be easily hung and removed, greatly improving the user experience.

8 Claims, 6 Drawing Sheets

FALL-PREVENTION MOVABLE WALL MOUNT

TECHNICAL FIELD

The present invention relates to the technical field of shower equipment, particularly a fall-prevention movable wall mount.

BACKGROUND

In the prior art, a handheld shower is typically used with a wall holder and movably inserted into the holder. However, to remove it, the shower needs to be lifted upward to disengage a handle tail from the holder before the shower is moved. To hang it, the handle tail must first be aligned with the holder and then inserted downward to secure the shower. Both hanging and removal operations are directional, resulting in inconvenient use.

SUMMARY

An objective of the present invention is to provide a fall-prevention movable wall mount that can address the above technical issues, offering the advantages of unrestricted mounting positions for the shower mount and convenient mounting of the handheld shower.

To achieve the above objective, the solution of the present invention is:

The fall-prevention movable wall mount includes a fixed base, a movable head, and a magnetic assembly.

The fixed base has a fixed surface on one side and is connected to one side of the movable head on the other side, the magnetic assembly is mounted on the other side of the movable head, and the magnetic assembly is configured to detachably attract and fix a handheld shower.

Further, the magnetic assembly includes a mounting ring and a magnetic element, the mounting ring is fixedly connected in a mounting opening provided on the other side of the movable head, a middle part of the mounting ring is provided with a mounting through hole, and the magnetic element is mounted in the mounting through hole.

Further, the other side of the fixed base has a movement hole, one side of the movable head is provided with a ball head part, and the ball head part is rotatably assembled in the movement hole.

Further, the fixed base includes a base, a cover, a first damping ring, and a second damping ring, where the base has the fixed surface on one side and a rotating base protruding from the other side, the cover fixedly covers a side of the rotating base of the base, the cover is provided with a through hole, the movement hole is formed between the through hole of the cover and the rotating base, the first damping ring and the second damping ring are respectively disposed on two sides of the ball head part, the first damping ring is mounted between the through hole and the ball head part, and the second damping ring is mounted between the ball head part and the rotating base.

Further, a protective cover is further disposed between an outer periphery of the magnetic element and the mounting through hole, the protective cover has an opening close to an inner side of an interior of the mounting opening, with an outer side closed, an edge of the opening of the protective cover is provided with an outwardly flipped snap flange, the snap flange is snapped onto an edge of an inner side of the mounting through hole, the magnetic element is loaded into the protective cover from the opening, and a protruding post abutting the magnetic element protrudes from the interior of the mounting opening.

Further, the mounting ring has an annular collar protruding from the mounting opening, the mounting through hole is in the middle of the annular collar, an outer periphery of the annular collar is circumferentially provided with at least two connection parts spaced apart, the connection part is provided with a connection hole, the mounting opening is correspondingly provided with locking holes matching the connection holes, locking screws are inserted through the connection holes and screwed into the locking holes, the handheld shower has an annular groove for insertion of the annular collar, and a middle part of the annular groove has a magnetic structure magnetically cooperating with the magnetic element.

Further, an outer end of the annular collar has a limit ring protruding radially outward, the handheld shower has a mounting base, the annular groove is formed in the mounting base, a locking block is movably assembled in the mounting base, the locking block is movable along a radial direction of the annular groove, the locking block is provided with a groove communicating with the annular groove, a side wall of the groove is provided with a limiting flange, and the annular collar movably fits in the annular groove to enable magnetic cooperation between the magnetic element and the magnetic structure, and to drive the locking block to move inward along the radial direction of the annular groove, thereby causing the limiting flange to limit the limit ring in an axial direction of the annular groove.

Further, the groove is provided with a first inclined surface, the first inclined surface is on a side of the groove close to a center of the annular groove, an end of the annular collar abuts the first inclined surface when the magnetic element magnetically cooperates with the magnetic structure, and an outer side and an inner side of the limiting flange are respectively provided with a second inclined surface and a third inclined surface.

Further, a wear-resistant ring sleeves the outer periphery of the annular collar, the wear-resistant ring has a wear-resistant surface on an outer side and at least two protruding snap blocks circumferentially spaced on an inner side, slots for snapping the snap blocks are each formed between adjacent two of the connection parts of the annular collar, and the wear-resistant ring is snap-fitted onto the annular collar while sealing the mounting opening.

Further, both the magnetic element and the magnetic structure are magnets.

After the use of the above technical solution, the fixed base has the fixed surface, and a structure such as double-sided tape, glue, or suction cup may be provided on the fixed surface, allowing the fixed base to be freely and conveniently fixed at any position on a wall surface, with quick and convenient mounting. With the arrangement of the ball head part with the magnetic assembly, the handheld shower can be easily hung and removed, greatly improving the user experience.

Figure 1:
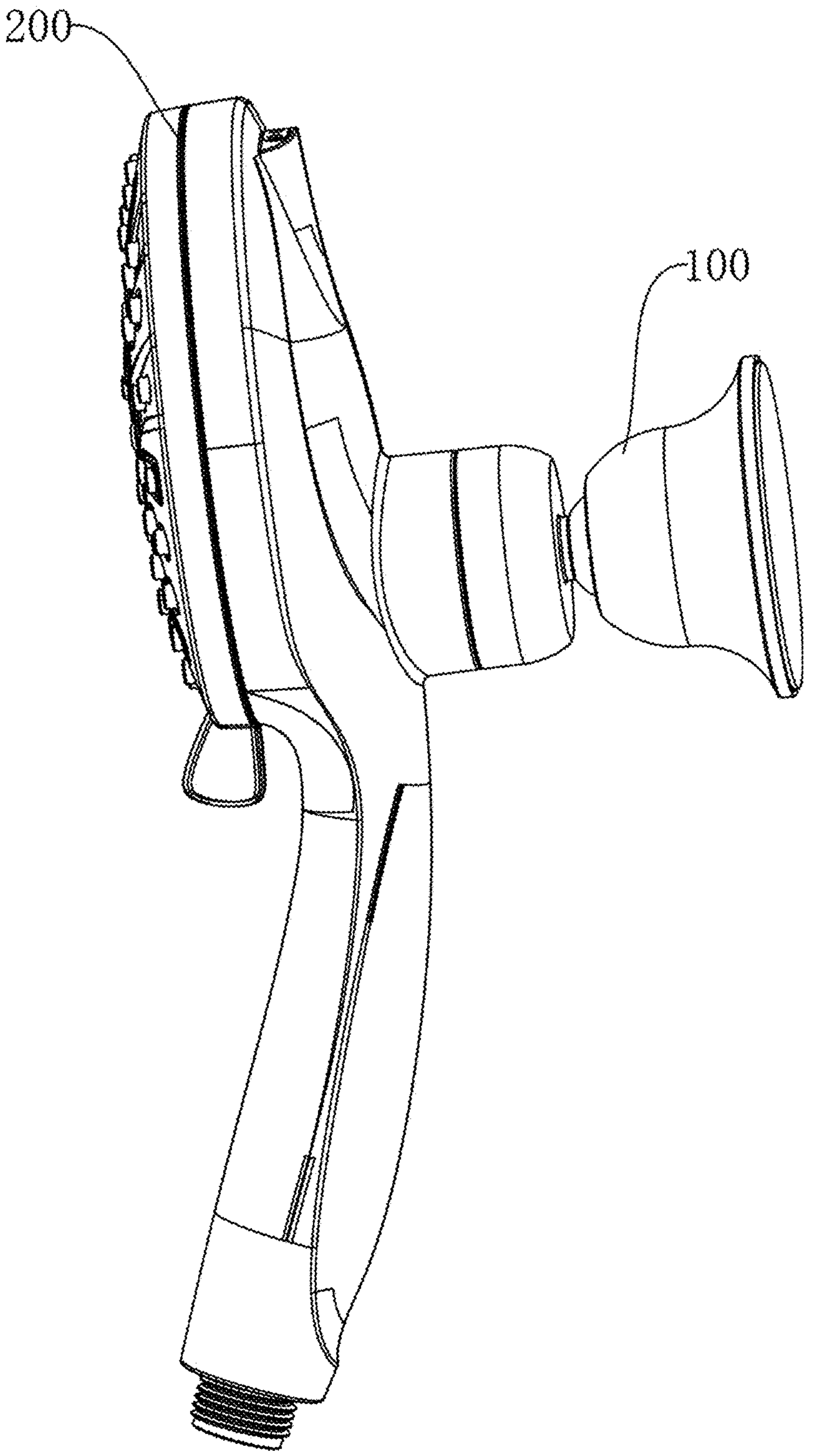
FIG. 1 is a three-dimensional diagram of a handheld shower according to an embodiment of the present invention.

Description of reference numerals: movable wall mount 100, fixed base 10, fixed surface 11, movement hole 12, base 13, rotating base 131, cover 14, through hole 141, first damping ring 15, second damping ring 16, arc groove 161, movable head 20, ball head part 21, mounting opening 22, protruding post 221, locking hole 222, screw post 223, magnetic assembly 30, mounting ring 31, mounting through hole 311, annular collar 312, connection part 313, connection hole 314, locking screw 315, limit ring 316, slot 317, magnetic element 32, protective cover 33, snap flange 331, wear-resistant ring 34, wear-resistant surface 341, snap block 342, handheld shower 200, annular groove 40, magnetic structure 50, mounting base 60, locking block 70, groove 71, limiting flange 711, first inclined surface 712, second inclined surface 713, and third inclined surface 714.

DETAILED DESCRIPTION OF THE EMBODIMENTS

To make the objective, technical solutions, and advantages of the embodiments of this application clearer, the technical solutions in the embodiments of this application will be described clearly and completely below with reference to the drawings in the embodiments of this application. Obviously, the described embodiments are some of the embodiments of this application, not all embodiments. The components of the embodiments of this application described and shown in the drawings herein can be arranged and designed in different configurations.

Figure 2:
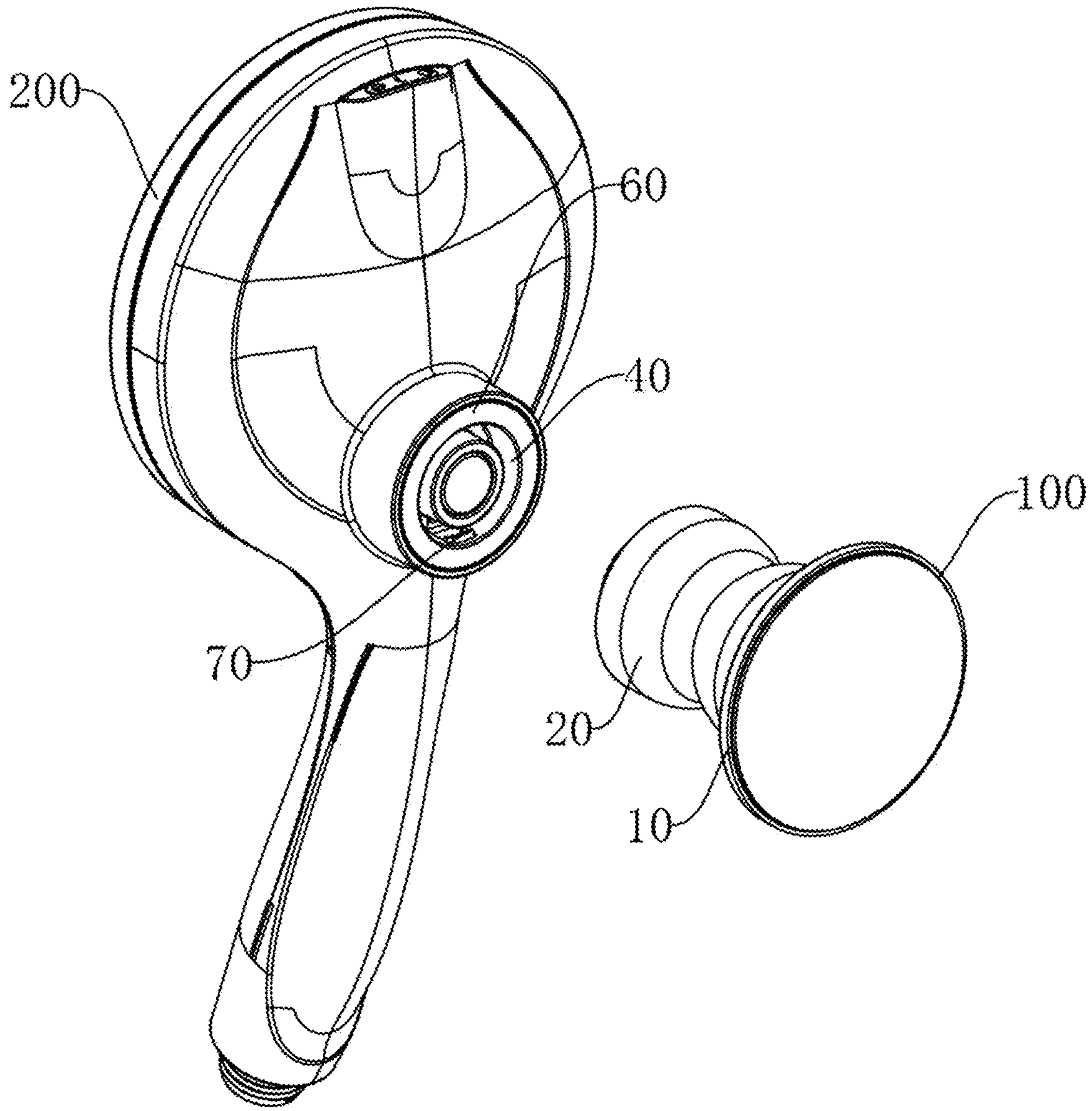
FIG. 2 is an exploded view of the handheld shower according to an embodiment of the present invention.
Figure 3:
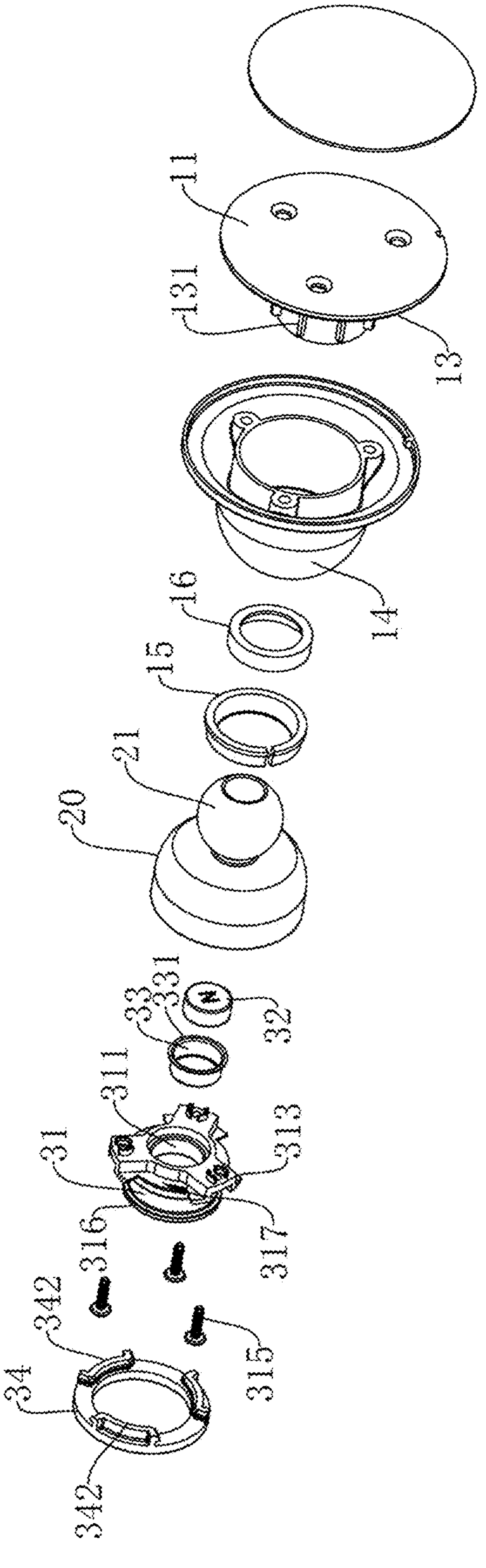
FIG. 3 is an exploded view according to an embodiment of the present invention.
Figure 4:
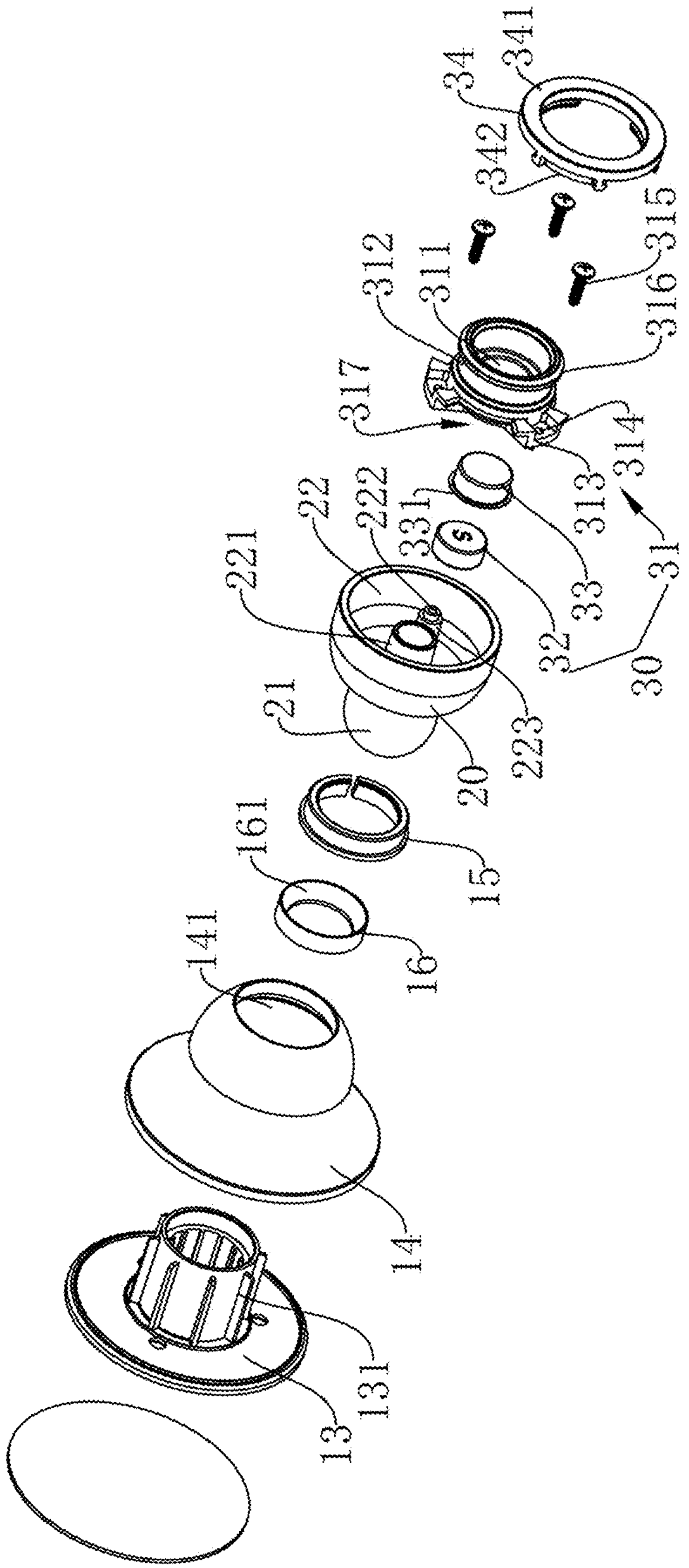
FIG. 4 is an exploded view from another angle according to an embodiment of the present invention.
Figure 5:
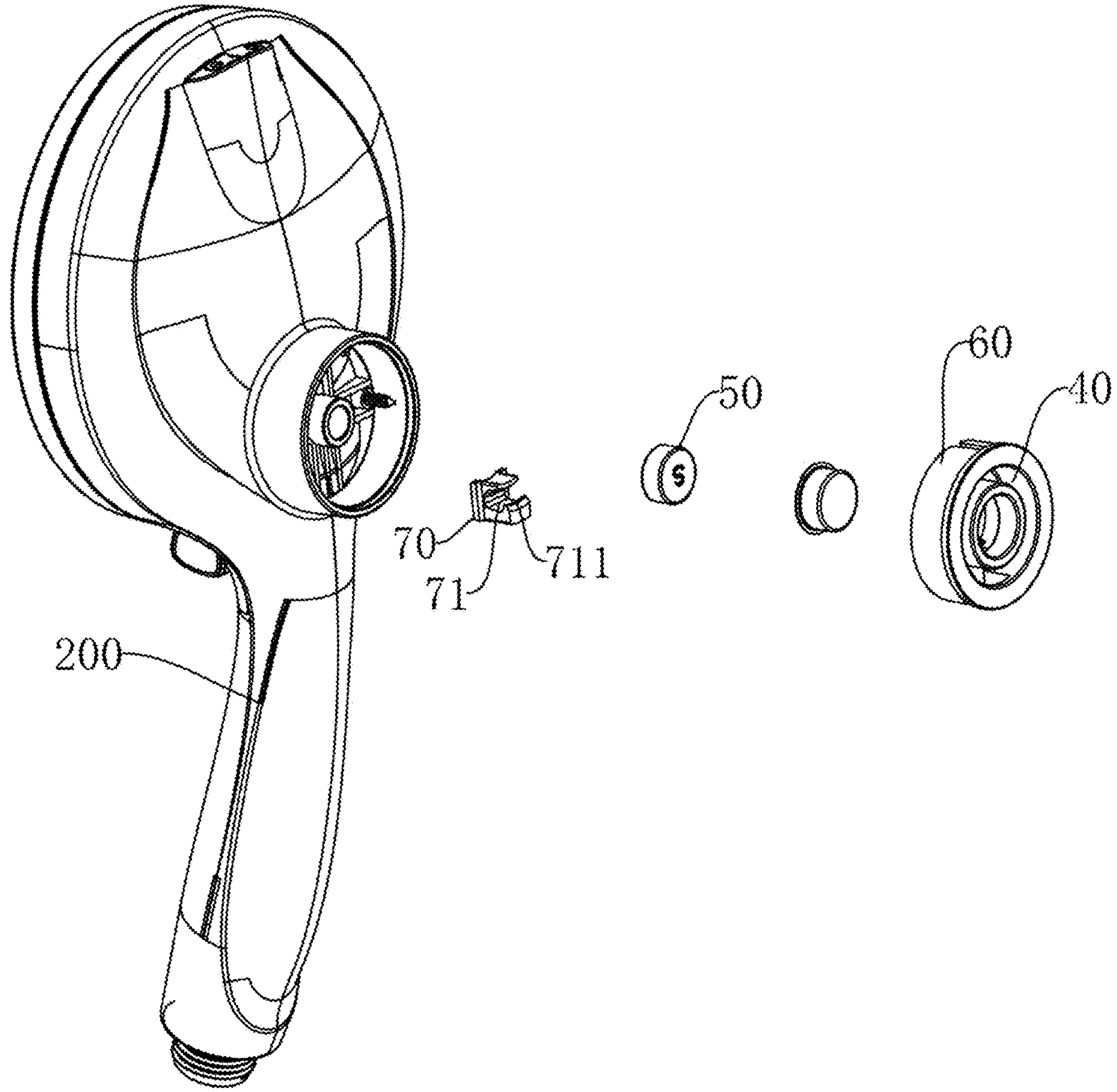
FIG. 5 is a schematic diagram of the handheld shower according to an embodiment of the present invention.
Figure 6:
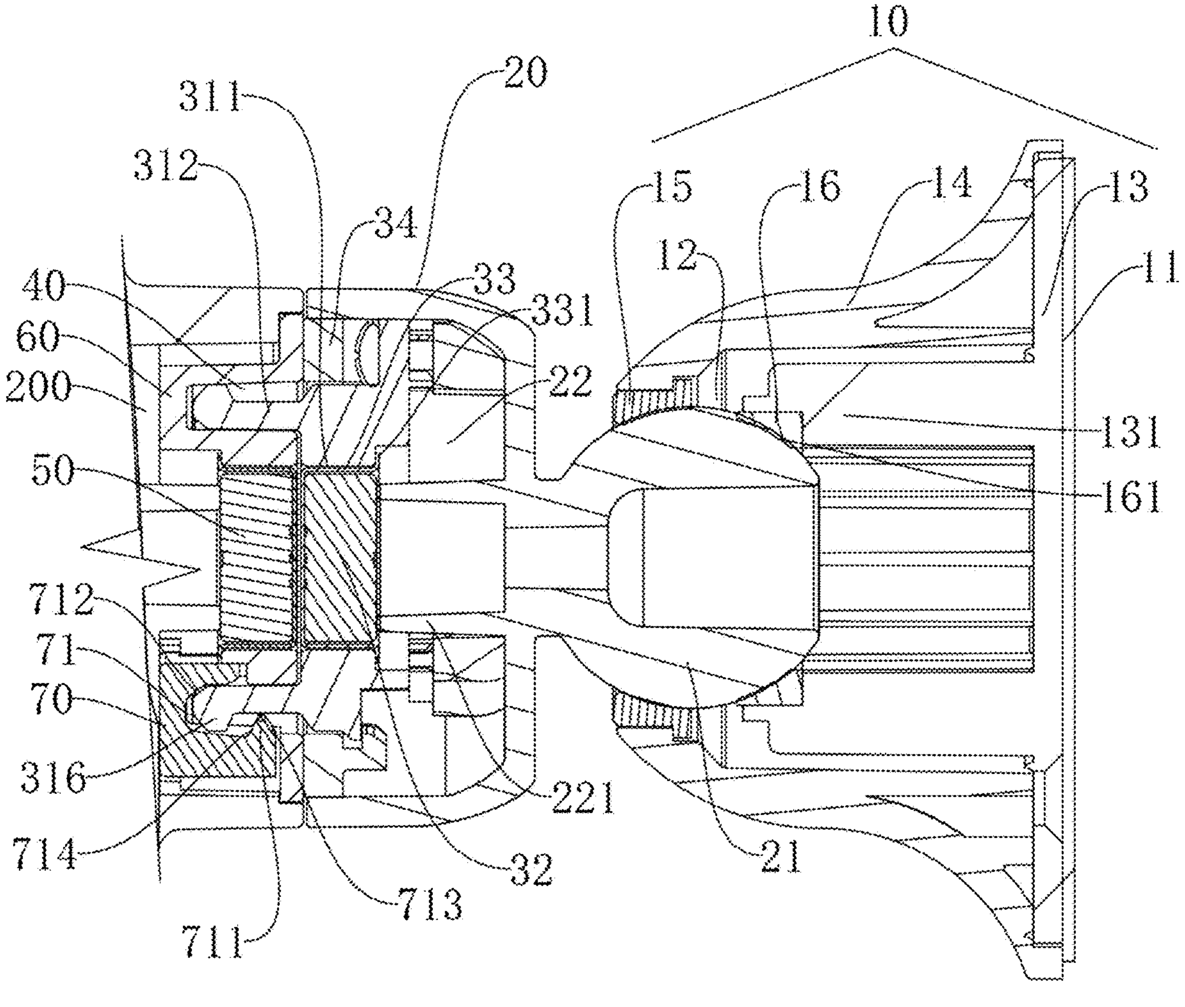
FIG. 6 is a schematic cross-sectional view of a partial structure of the handheld shower according to an embodiment of the present invention.

As shown in FIGS. 1 to 6, the embodiments provide a fall-prevention movable wall mount 100, including a fixed base 10, a movable head 20, and a magnetic assembly 30.

The fixed base 10 has a fixed surface 11 on one side and is connected to one side of the movable head 20 on the other side; and the fixed surface 11 is used to be fixedly attached to a wall surface. In actual use, a structure such as double-sided tape, glue, or suction cup may be provided on the fixed surface 11, enabling the fixed base 10 to be freely and conveniently fixed at any position on a wall surface, with quick and convenient mounting.

The magnetic assembly 30 may be mounted on the other side of the movable head 20, where the magnetic assembly 30 is configured to detachably attract and fix a handheld shower 200. In this way, the handheld shower 200 can be conveniently magnetically fixed to the movable wall mount 100, making it more convenient to attach and remove.

Specifically, the other side of the fixed base 10 may have a movement hole 12, one side of the movable head 20 is provided with a ball head part 21, and the ball head part 21 is rotatably assembled in the movement hole 12. The other side of the movable head 20 has a mounting opening 22, and the magnetic assembly 30 is mounted in the mounting opening 22. With the arrangement of the ball head part 21, the movable head 20 can freely rotate universally around the movement hole 12, driving the handheld shower 200 that is magnetically attached to the magnetic assembly 30 on the other side of the movable head 20, and universal rotation can be achieved, allowing free adjustment of a water outlet direction thereof, greatly improving the user experience. The handheld shower 200 may be provided with a magnetic structure that magnetically cooperates with the magnetic assembly 30.

Specifically, the magnetic assembly 30 includes a mounting ring 31 and a magnetic element 32. The mounting ring 31 is fixedly connected in the mounting opening 22, a middle part of the mounting ring 31 is provided with a mounting through hole 311, and the magnetic element 32 is mounted in the mounting through hole 311. This facilitates the mounting and fixation of the magnetic element 32.

In the embodiments, both the magnetic element 32 and the magnetic structure may be magnets, or one may be made of a strong magnet material, and the other may be made of a magnetically attractive material such as stainless steel. A protective cover 33 may be further disposed between an outer periphery of the magnetic element 32 and the mounting through hole 311, the protective cover 33 has an opening close to an inner side of an interior of the mounting opening 22, with an outer side closed, an edge of the opening of the protective cover 33 is provided with an outwardly flipped snap flange 331, the snap flange 331 is snapped onto an edge of an inner side of the mounting through hole 311, the magnetic element 32 is loaded into the protective cover 33 from the opening, and a protruding post 221 abutting the magnetic element 32 protrudes from the interior of the mounting opening 22. The arrangement of the protective cover 33 can prevent falling, protect the appearance, and offer functions such as waterproofing and corrosion resistance.

Further, the mounting ring 31 in the embodiments may have an annular collar 312 protruding from the mounting opening 22, the mounting through hole 311 is in the middle of the annular collar 312, an outer periphery of the annular collar 312 is circumferentially provided with at least two connection parts 313 spaced apart, the connection part 313 is provided with a connection hole 314, the mounting opening 22 is correspondingly provided with locking holes 222 matching the connection holes 314, and locking screws 315 are inserted through the connection holes 314 and screwed into the locking holes 222. In the embodiments, three connection parts 313 and three locking screws 315 are provided, which may be connected to screw posts 223 with the locking holes 222 provided in the mounting opening 22, thereby achieving secure locking and fixation of the mounting ring 31 to the mounting opening 22.

Correspondingly, the handheld shower 200 may have an annular groove 40 for insertion of the annular collar 312, and a middle portion of the annular groove 40 has a magnetic structure 50 magnetically cooperating with the magnetic element 32. Thus, when the annular groove 40 of the handheld shower 200 is inserted and connected with the annular collar 312, the magnetic structure 50 can be attracted to the magnetic element 32 for fixation.

Since magnetic fixation is prone to detachment under force, to prevent the handheld shower 200 from detaching from the movable wall mount 100 due to accidental collision, an outer end of the annular collar 312 in the embodiments has a limit ring 316 protruding radially outward, the handheld shower 200 may have a mounting base 60, the annular groove 40 is formed in the mounting base 60, a locking block 70 is movably assembled in the mounting base 60, the locking block 70 is movable along a radial direction of the annular groove 40, the locking block 70 is provided with a groove 71 communicating with the annular groove 40, a side wall of the groove 71 is provided with a limiting flange 711, and the annular collar 312 movably fits in the annular groove 40 to enable magnetic cooperation between the magnetic element 32 and the magnetic structure 50, and to drive the locking block 70 to move inward along the radial direction of the annular groove 40, thereby causing the limiting flange 711 to limit the limit ring 316 in an axial direction of the annular groove 40. Thus, the locking block 70 can lock the limit ring 316 to prevent accidental detachment.

Further, the groove 71 may be provided with a first inclined surface 712, the first inclined surface 712 is on a side of the groove 71 close to a center of the annular groove 40, an end of the annular collar 312 abuts the first inclined surface 712 when the magnetic element 32 magnetically cooperates with the magnetic structure 50, and an outer side and an inner side of the limiting flange 711 are respectively provided with a second inclined surface 713 and a third inclined surface 714.

When the magnetic structure 50 magnetically cooperates with the magnetic element 32, the annular collar 312 is inserted into the groove 71 and abuts the first inclined surface 712, causing the locking block 70 to move inward along the radial direction of the annular groove 40 under the drive of the end of the annular collar 312. Through the first inclined surface 712, the annular collar 312 can drive the locking block 70, converting the attraction force between the magnetic structure 50 and the magnetic element 32 into a radial force via the first inclined surface 712 to drive the locking block 70.

The outer side and the inner side of the limiting flange 711 are respectively provided with the second inclined surface 713 and the third inclined surface 714, where the second inclined surface 713 and the third inclined surface 714, functioning similarly to the first inclined surface 712, are used to decompose external forces and drive the radial movement of the locking block 70. When the end of the annular collar 312 contacts the second inclined surface 713, it can push the locking block 70 outward along the radial direction of the annular groove 40, allowing the limit ring 316 to pass over the limiting flange 711, thus enabling the annular collar 312 to enter the groove 71. When the user wants to remove the handheld shower 200, moving the handheld shower 200 along the axial direction of the annular collar 312 causes the limit ring 316 to first contact the third inclined surface 714; and similarly pushing the locking block 70 outward along the radial direction of the annular groove 40 allows the limit ring 316 to pass over the limiting flange 711, enabling the annular collar 312 to disengage from the groove 71.

In the embodiments, a wear-resistant ring 34 sleeves the outer periphery of the annular collar 312, the wear-resistant ring 34 has a wear-resistant surface 341 on an outer side and at least two protruding snap blocks 342 circumferentially spaced on an inner side, slots 317 for snapping the snap blocks 342 are each formed between adjacent two of the connection parts 313 of the annular collar 312, and the wear-resistant ring 34 is snap-fitted onto the annular collar 312 while sealing the mounting opening 22. The wear-resistant ring 34 may be made of materials such as polyoxymethylene, which has excellent physical, mechanical, and chemical properties, especially outstanding wear resistance. This is beneficial for extending its service life, reducing friction loss between the handheld shower 200 and the movable wall mount 100, and lowering the sharp noise when the two come into contact and friction.

In the embodiments, the fixed base 10 includes a base 13, a cover 14, a first damping ring 15, and a second damping ring 16. The base 13 has the fixed surface 11 on one side and a rotating base 131 protruding from the other side. The cover 14 fixedly covers a side of the rotating base 131 of the base 13, and the two may be integrally fixed by ultrasonic welding. The cover 14 is provided with a through hole 141, and the movement hole 12 is formed between the through hole 141 of the cover 14 and the rotating base 131. The first damping ring 15 and the second damping ring 16 are respectively disposed on two sides of the ball head part 21. The first damping ring 15 is mounted between the connection hole 314 and the ball head part 21, while the second damping ring 16 is mounted between the ball head part 21 and the rotating base 131. The arrangement of the first damping ring 15 and the second damping ring 16 facilitates the rotation of the ball head part 21, providing a better rotational feel. The first damping ring 15 and the second damping ring 16 may be made of rubber material.

Specifically, the first damping ring 15 is an open ring. One side of the second damping ring 16 is snapped onto the end face of the rotating base 131, and the other side has an arc groove 161 for the rotational fit of the ball head part 21.

The above descriptions are only the preferred implementations of the present invention. The scope of protection of the present invention is not limited to the above-mentioned embodiments. Any technical solutions falling within the idea of the present invention are within the scope of protection of the present invention. It should be noted that for those of ordinary skill in the art, equivalent changes and modifications under the premise of not departing from the principles of the present invention should still fall within the scope of protection of the present invention.

In the description of the embodiments of this application, it should be understood that the indicated orientations or positional relationships are based on the orientations or positional relationships shown in the drawings, or the usual orientations or positional relationships when the product of this application is used, or the usual orientations or positional relationships understood by those skilled in the art. They are solely for the convenience of describing this application and simplifying the description, and are not intended to indicate or imply that the referred devices or elements must have a specific orientation, be constructed, and operate in a specific orientation. Therefore, they should not be construed as limitations to this application. In the description of this application, the meanings of "multiple" and "several" are two or more, unless otherwise explicitly and specifically limited.

What is claimed is:

1. A fall-prevention movable wall mount, comprising a fixed base, a movable head, and a magnetic assembly, wherein the fixed base has a fixed surface on one side and is connected to one side of the movable head on the other side, the magnetic assembly is mounted on the other side of the movable head, and the magnetic assembly is configured to detachably attract and fix a handheld shower, wherein the magnetic assembly comprises a mounting ring and a magnetic element, the mounting ring is fixedly connected in a mounting opening provided on the other side of the movable head, a middle part of the mounting ring is provided with a mounting through hole, and the magnetic element is mounted in the mounting through hole, wherein the mounting ring has an annular collar protruding from the mounting opening, the mounting through hole is in the middle of the annular collar, an outer periphery of the annular collar is circumferentially provided with at least two connection parts spaced apart, the connection part is provided with a connection hole, the mounting opening is correspondingly provided with locking holes matching the connection holes, locking screws are inserted through the connection holes and screwed into the locking holes, the handheld shower has an annular groove for insertion of the annular collar, and a middle part of the annular groove has a magnetic structure magnetically cooperating with the magnetic element.

2. The fall-prevention movable wall mount according to claim 1, wherein the other side of the fixed base has a movement hole, one side of the movable head is provided with a ball head part, and the ball head part is rotatably assembled in the movement hole.

3. The fall-prevention movable wall mount according to claim 2, wherein the fixed base comprises a base, a cover, a first damping ring, and a second damping ring, wherein the base has the fixed surface on one side and a rotating base protruding from the other side, the cover fixedly covers a side of the rotating base of the base, the cover is provided with a through hole, the movement hole is formed between the through hole of the cover and the rotating base, the first damping ring and the second damping ring are respectively disposed on two sides of the ball head part, the first damping ring is mounted between the through hole and the ball head part, and the second damping ring is mounted between the ball head part and the rotating base.

4. The fall-prevention movable wall mount according to claim 1, wherein a protective cover is further disposed between an outer periphery of the magnetic element and the mounting through hole, the protective cover has an opening close to an inner side of an interior of the mounting opening, with an outer side closed, an edge of the opening of the protective cover is provided with an outwardly flipped snap flange, the snap flange is snapped onto an edge of an inner side of the mounting through hole, the magnetic element is loaded into the protective cover from the opening, and a protruding post abutting the magnetic element protrudes from the interior of the mounting opening.

5. The fall-prevention movable wall mount according to claim 1, wherein an outer end of the annular collar has a limit ring protruding radially outward, the handheld shower has a mounting base, the annular groove is formed in the mounting base, a locking block is movably assembled in the mounting base, the locking block is movable along a radial direction of the annular groove, the locking block is provided with a groove communicating with the annular groove, a side wall of the groove is provided with a limiting flange, and the annular collar movably fits in the annular groove to enable magnetic cooperation between the magnetic element and the magnetic structure, and to drive the locking block to move inward along the radial direction of the annular groove, thereby causing the limiting flange to limit the limit ring in an axial direction of the annular groove.

6. The fall-prevention movable wall mount according to claim 5, wherein the groove is provided with a first inclined surface, the first inclined surface is on a side of the groove close to a center of the annular groove, an end of the annular collar abuts the first inclined surface when the magnetic element magnetically cooperates with the magnetic structure, and an outer side and an inner side of the limiting flange are respectively provided with a second inclined surface and a third inclined surface.

7. The fall-prevention movable wall mount according to claim 1, wherein a wear-resistant ring sleeves the outer periphery of the annular collar, the wear-resistant ring has a wear-resistant surface on an outer side and at least two protruding snap blocks circumferentially spaced on an inner side, slots for snapping the snap blocks are each formed between adjacent two of the connection parts of the annular collar, and the wear-resistant ring is snap-fitted onto the annular collar while sealing the mounting opening.

8. The fall-prevention movable wall mount according to claim 1, wherein both the magnetic element and the magnetic structure are magnets.

* * * * *